US012370118B1

(12) United States Patent
Gorgizian et al.

(10) Patent No.: US 12,370,118 B1
(45) Date of Patent: Jul. 29, 2025

(54) SIDE CARRIER FOR STANDARD WALKER WITH WHEELS

(71) Applicants: Eric Gorgizian, Warwick, RI (US); Thomas Munroe, Jr., Warwick, RI (US)

(72) Inventors: Eric Gorgizian, Warwick, RI (US); Thomas Munroe, Jr., Warwick, RI (US)

(73) Assignee: Eric Gorgizian, Warwick, RI (US)

( * ) Notice: Subject to any disclaimer, the term of this patent is extended or adjusted under 35 U.S.C. 154(b) by 0 days.

(21) Appl. No.: 18/603,556

(22) Filed: Mar. 13, 2024

(51) Int. Cl.
*A61H 3/04* (2006.01)
*A61H 3/00* (2006.01)

(52) U.S. Cl.
CPC ......... *A61H 3/04* (2013.01); *A61H 2003/004* (2013.01)

(58) Field of Classification Search
CPC ................................................ A61H 2003/004
See application file for complete search history.

(56) References Cited

U.S. PATENT DOCUMENTS 3,232,251 A * 2/1966 Hughes .................... A61H 3/00 108/50.16
3,516,425 A * 6/1970 Rigal ....................... A61H 3/00 248/157
4,074,683 A * 2/1978 Di Chiara ................ A61H 3/00 211/164
4,708,274 A * 11/1987 Roche ...................... A61H 3/00 224/407
5,273,063 A * 12/1993 Farr ......................... A61H 3/00 482/66
5,392,802 A * 2/1995 Farr ......................... A61H 3/00 D6/406.1
5,642,748 A * 7/1997 Obitts ...................... A61H 3/00 135/66
5,694,959 A * 12/1997 Hiller ....................... A61H 3/04 135/66
6,883,529 B2 * 4/2005 Kvaternik ................ A61H 3/00 135/66
8,245,719 B2 * 8/2012 Kirby ....................... A61H 3/04 135/66
2002/0179131 A1 * 12/2002 Johnson ................... A61H 3/00 135/66
2024/0238150 A1 * 7/2024 Spychalski .............. A61H 3/00

* cited by examiner

*Primary Examiner* — Noah Chandler Hawk

(57) ABSTRACT

An ergonomically enhanced wheeled mobility walker with a laterally attached platform including a cup holder as well as a tabletop releasably attached to a leg of the walker and which can be transitioned from a vertical resting position anterior to the walker to a horizontal working position lateral to the walker preferably engaging or proximal to the platform.

3 Claims, 6 Drawing Sheets

SIDE CARRIER FOR STANDARD WALKER WITH WHEELS

TECHNICAL FIELD

The present invention generally relates to the field of mobility walkers. In particular, some embodiments relate to ergonomic enhancements for wheeled mobility walkers.

BACKGROUND

Wheeled mobility walkers are known in the arts and are often used by ambulation-challenged users such as the elderly or injured to assist ambulation via weight bearing and balance support often through raised hand grips that are often part of a general framework that is partially incomplete or open in the back (especially on the lower back portion of the general framework) thereby allowing a user to step within the general framework during usage, or at least not have their ambulation impeded as much as it would be if the (lower) back portion of the general framework was complete/present.

In one of its simplest forms such a walker can be comprised of two approximate U-shaped lateral support elements joined by at least one (usually at least two) transversing element(s) located on the anterior of the general framework helping to maintain the lateral support elements substantially in planarly parallel opposing position to one another. Sometimes the transversing element(s) are transitionable from an unfolded to a folded position to promote storage of the walker between periods of usage but during usage to assist mobility/stability, the transversing element(s) are generally in a rigid unfolded position.

The approximate U-shaped lateral support elements are often formed by hollow pipe but can be formed by any other number of sufficiently rigid material including but not limited to squared tubing or metal bars/rods with the choice of hollow pipe of sufficient rigidity and strength generally offering an advantage of lowered weight as compare to squared pipe or metal bars/rods. Furthermore, the proximate U-shaped lateral support elements need not be U-shaped but can include any other number of shapes, including but not limited to, angled portions, curved portions other than a U-shape, or portions otherwise sloped at less than infinity in relation to the ground (i.e., not precisely vertical)—the primary requirements being that the lateral support elements or their equivalent should include an upper portion for gripping to support/stabilize the user as well as two legs terminating near the ground and susceptible to attachment of wheel assemblies, with the center of gravity for the wheeled mobility walker as well as the base portions of the lateral supports being positioned so as to encourage user mobility and stability (i.e., prevent tipping over of user and/or mobility walker).

Often, for overall walker stability and other reasons, the two legs of each separate U-shaped lateral support are joined to one another by one or more support braces; however this is not always necessary as historically potential material strength has tended to increase with technology improvements such that extra bracing is less necessary. Sometimes the U-shaped lateral support is part of more extensive side frame including two or more braces generally perpendicular to the legs of a lateral support element, or occasionally in a X-shaped or sloped relationship between the two legs of a lateral support element.

There is a need for wheeled mobility walkers with ergonomic and/or lifestyle enhancement combinations to improve users' quality of life, sense and pride of independence, and overall happiness—for example by increasing user ability to utilize limited space. For example, many elderly or injured people would benefit from a wheeled mobility walker offering ergonomic configurations allowing for support/storage of drinking cups, dining plates, electronic devices such as cell phones, small personal items, or larger personal aids such as canes and umbrellas between periods of mobility walker usage.

Furthermore, there is a need for wheeled mobility walkers where a tabletop can be transitioned from a generally oriented horizontal tabletop surface working position while being used for dining to a generally oriented vertical tabletop surface storage position in which walker usage and movement is less impeded (or impeded differently) than when such a tabletop is in usage for dining. Some already existing mobility walkers have dining trays or baskets for carrying items anterior to the mobility walker but such can impede potential ambulatory movement in the walker (e.g., due to dropped items), may not best utilize available space, and may create difficulty in the user reaching over the entire walker to reach food, drink, or other items.

Furthermore, there is a need for wheeled mobility walkers in which food, drink, electronic devices, small personal items, and larger personal aids such as canes or umbrellas can be maintained more stably even potentially while the wheeled mobility walker is being used to assist user mobility/stability.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the disclosed enhanced wheeled mobility walker can include a "standard" walker with two or four wheel assemblies on separate legs, with the term "standard" being used in a more allowing manner so as to allow for two and four wheeled walkers versus its strictest sense in which the term "standard" only includes mobility walkers without wheels—the term "standard" has become more generally liberally utilized in relation to walkers since the appearance of rollators of more complex (but also usually much more expensive) design which often include handle bars, more complex lateral supports sometimes allowing for folding, and/or a seat for the user to sit upon, with the term "standard" now often expanding from a simple formerly "standard" non-wheeled walker design to include the addition of (usually two front or sometimes four total) wheel assemblies.

Ergonomic enhancements (i.e., improvements) as described herein for this standard walker generally include a laterally attached platform with a cup holder and a tabletop for holding a dining plate transitionable from an anterior, vertical storage position to a lateral, horizontal usage position in which a portion of the tabletop may rest upon a portion of the platform. Provisions are also made for platform and table recesses for electronic devices and retainment of a pouch-like element to hold small personal items, as well as a retainment clip extending anteriorly from the platform for retaining larger personal aids such a cane or umbrella.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings. Unless noted or otherwise obvious, directional descriptors for the described device are intended to substantially similarly match those for a person using the described invention for its intended typical purpose of ambulatory assistance. Said drawings including.

DETAILED DESCRIPTION

Figure 1:
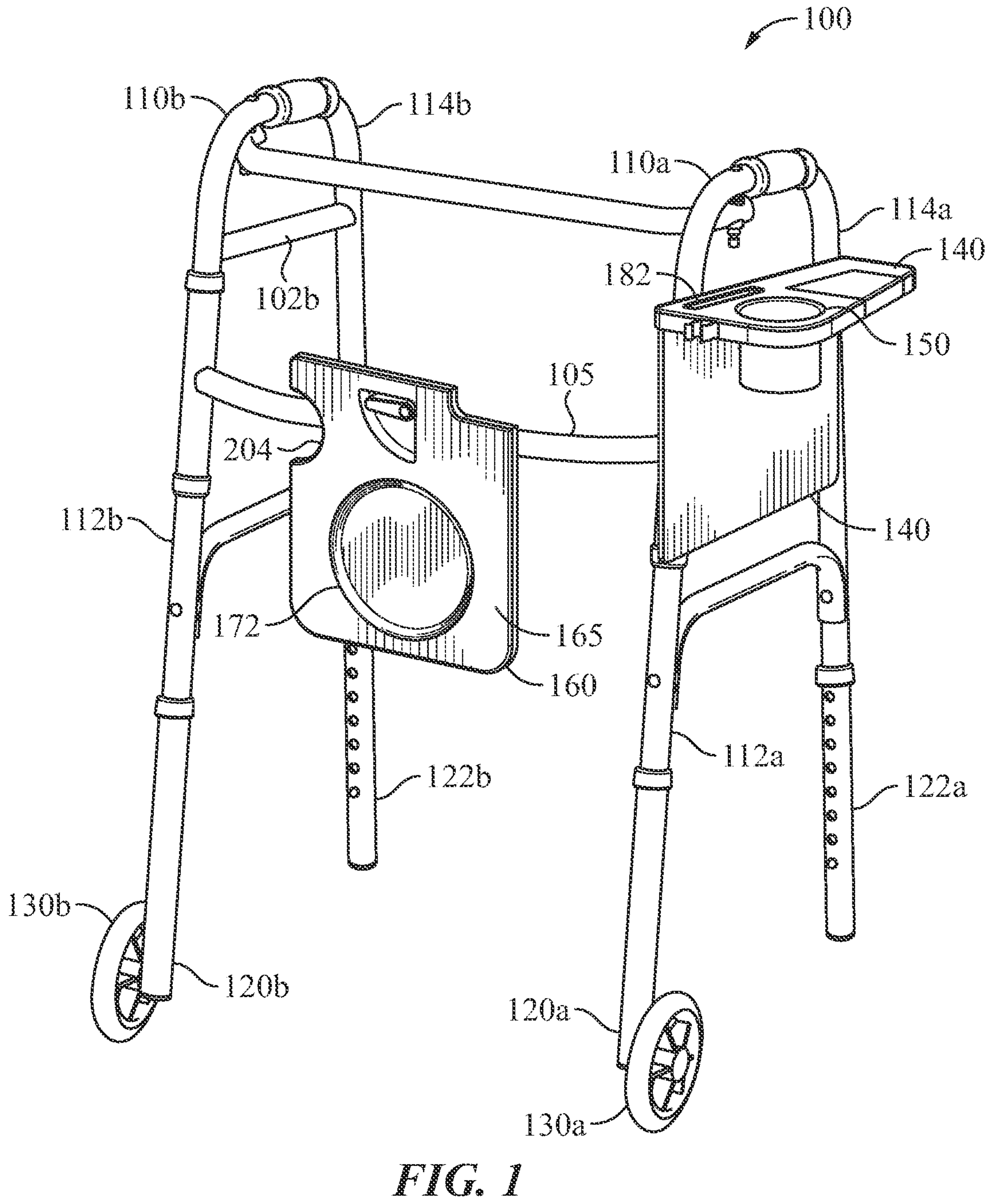
FIG. 1 illustrates an illustrative depiction with a perspective view of an enhanced wheeled mobility walker as disclosed herein with two front wheel assemblies and a transitionable tabletop in a resting position.

The specific details of the single embodiment or variety of embodiments described herein are to the described product or methods of use. Any specific details of the embodiments are used for demonstration purposes only and no unnecessary limitations or inferences are to be understood from there.

It is noted that the embodiments reside primarily in combinations of components and procedures related to the products. Accordingly, the product and components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments disclosed herein relate to ergonomic enhancements/improvement for standard wheeled mobility walkers that can include a platform attached laterally to one of two lateral support structures for the walker. In likely simplest form said lateral support structures can consist of approximate U-shaped structures held in substantially planarly parallel opposing relationship by one or more anterior transversing elements. Said U-shaped structures generally include an upper support element for a user to place weight or pressure upon (usually via their hands) which join a front and back leg each defining a leg terminus which may be attached to a wheel assembly—preferably a wheel assembly for each front leg terminus, or a wheel assembly for all four leg termini for the walker. The lateral support structures often incorporate more than approximate U-shaped structures and can be side frames including one or more stabilizing braces substantially perpendicularly joined to the two legs of a U-shaped structure or forming X-shaped/angled bracing relevant to the two legs of the U-shaped lateral support element.

Figure 2:
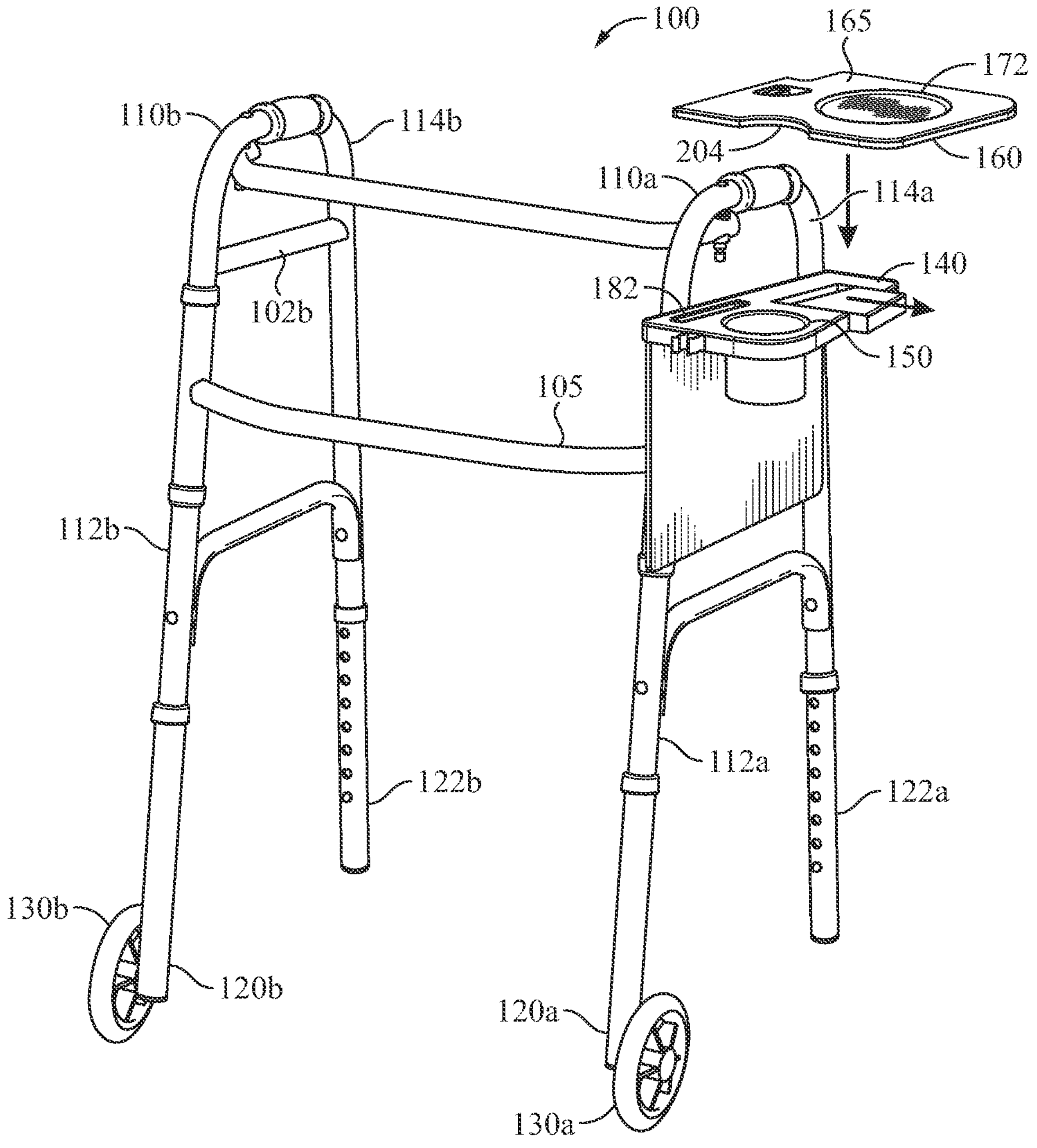
FIG. 2 illustrates an illustrative depiction with a perspective view of an enhanced wheeled mobility walker as disclosed herein with two front wheel assemblies and a transitionable tabletop in a working position.

Referring to FIGS. 1 and 2, an enhanced wheeled mobility walker 100 can include a first and second lateral support element body 102*a*, 102*b* defining an upper support section 110*a*, 110*b*, a front leg section 112*a*, 112*b*, a back leg section 114*a*, 114*b*, each front leg defining a front leg terminus section 120*a*, 120*b*, each back leg defining a back leg terminus section 122*a*, 122*b*, each front leg terminus section 120*a*, 120*b* being attached to a front wheel assembly 130*a*, 130*b* (shown schematically), each back leg terminus section 122*a*, 122*b* potentially having a back leg wheel assembly 132*a*, 132*b* as seen in FIG. 2. The enhanced wheeled mobility walker further comprising at least one transversing element 105 joining the first and second lateral support elements 102*a*, 102*b* in a substantially planarly parallel opposing relation.

The ergonomic improvement comprising a platform 140 attached between the front and back leg sections 112*a*, 114*a* of the first lateral support element 102*a*, said platform 140 defining the boundary of a cup recess 150 appropriate for assisting retainment of a drinking cup (not shown); the platform 140 could utilize any portion of the lateral support element 102*a* including any braces (not shown) or side frame structure (not shown) intimately associated or integral with basic U-shaped structure for the lateral support element 102*a*; the ergonomic improvement further comprising a tabletop 160 transitionable from a resting position as seen in FIG. 1 substantially vertically orientated on the anterior of the enhanced mobility walker to a working position as seen in FIG. 2 substantially horizontally oriented on the same lateral side of the walker 100 as the platform 140—horizontal and vertical orientation of platform and tabletop viewed in terms of the general horizontal plane within which the top working surface 165 of the tabletop 160 substantially lies within while in the working position while ignoring general flatness denied by defined recesses.

Preferably said tabletop 160 defines the boundaries of a dining recess 172 appropriate for assisting retainment of a dining plate (not shown). The cup recess 152 and dining recess 172 may each either only partially or may wholly penetrate the entire thickness of the respective platform 140 or tabletop 160 they are defined by.

In general, the transitionable tabletop 160 is attached to lateral support element 102*b* by any number of well-known connecting means but preferably said connecting means engaging with a portion of front leg section 112*a* and further comprising an arm 202 extending towards tabletop 160 and terminating in a tip (not shown) helping define a portion of any of a number of well-known articulable joints (not shown) that should at least permit articulation in a single direction but preferably in plural directions.

In some embodiments, the tabletop 160 may be releasably engaged with the walker 100. In such, the tabletop 160 may rest anteriorly on the walker 100 such that it may be attached and/or removed as needed. The tabletop 160 allows for a dish or other item to be placed thereon. The tabletop 160 may be secure using a locking mechanism to secure the tabletop 160 to the walker 100. The locking mechanism may be a quick release locking mechanism, or other locking mechanism commonly used in the arts.

Figure 3:
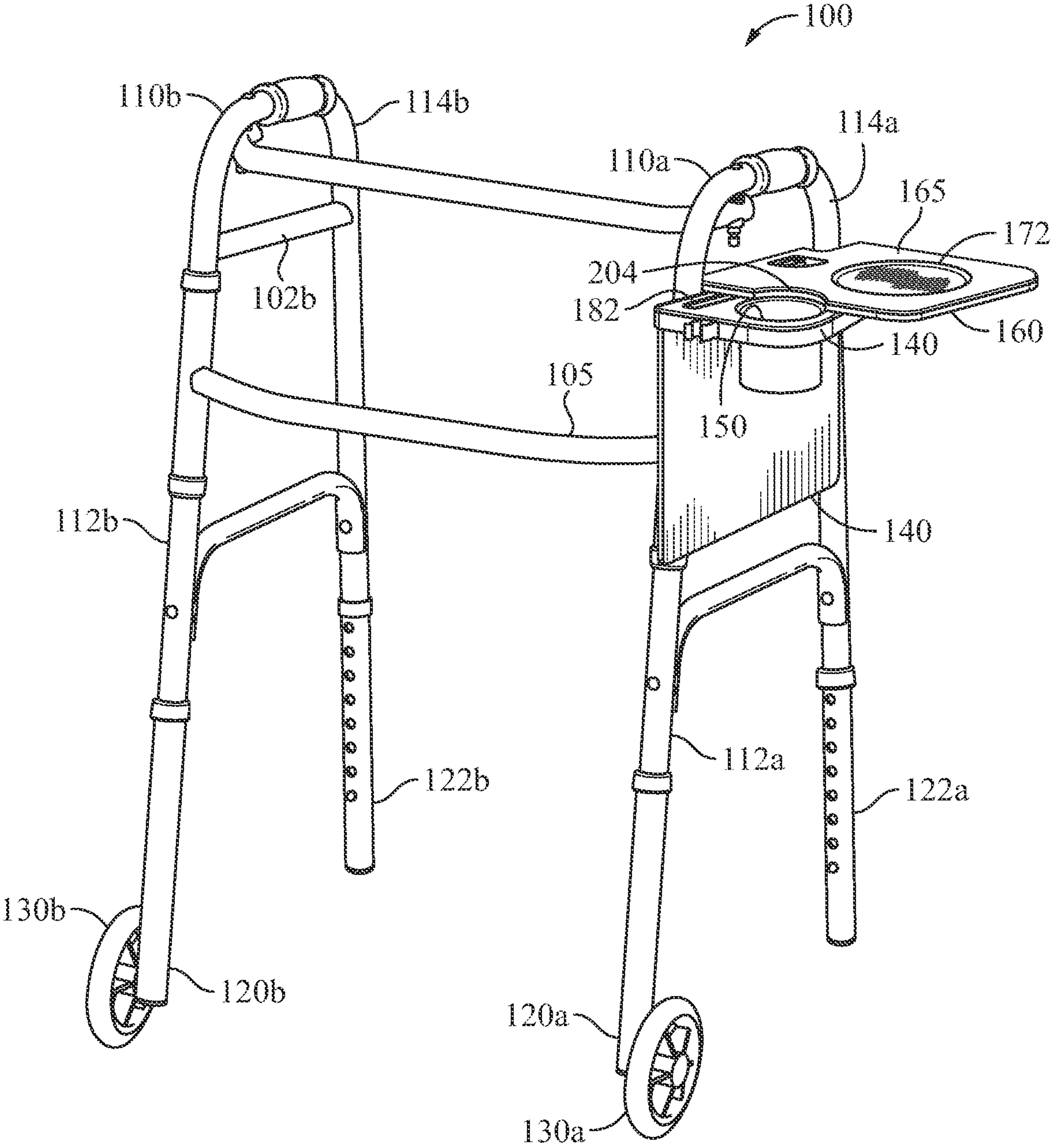
FIG. 3 illustrates an illustrative depiction of a perspective view of an enhanced wheeled mobility walker as disclosed herein with four wheel assemblies.

Referring to FIG. 3, in some embodiments, the enhanced wheeled mobility walker is further comprised by two back wheel assemblies 132*a*, 132*b* separately attached to respective back leg terminus sections 122*a*, 122*b* resulting in a four-wheeled enhanced wheeled mobility walker.

Figure 4:
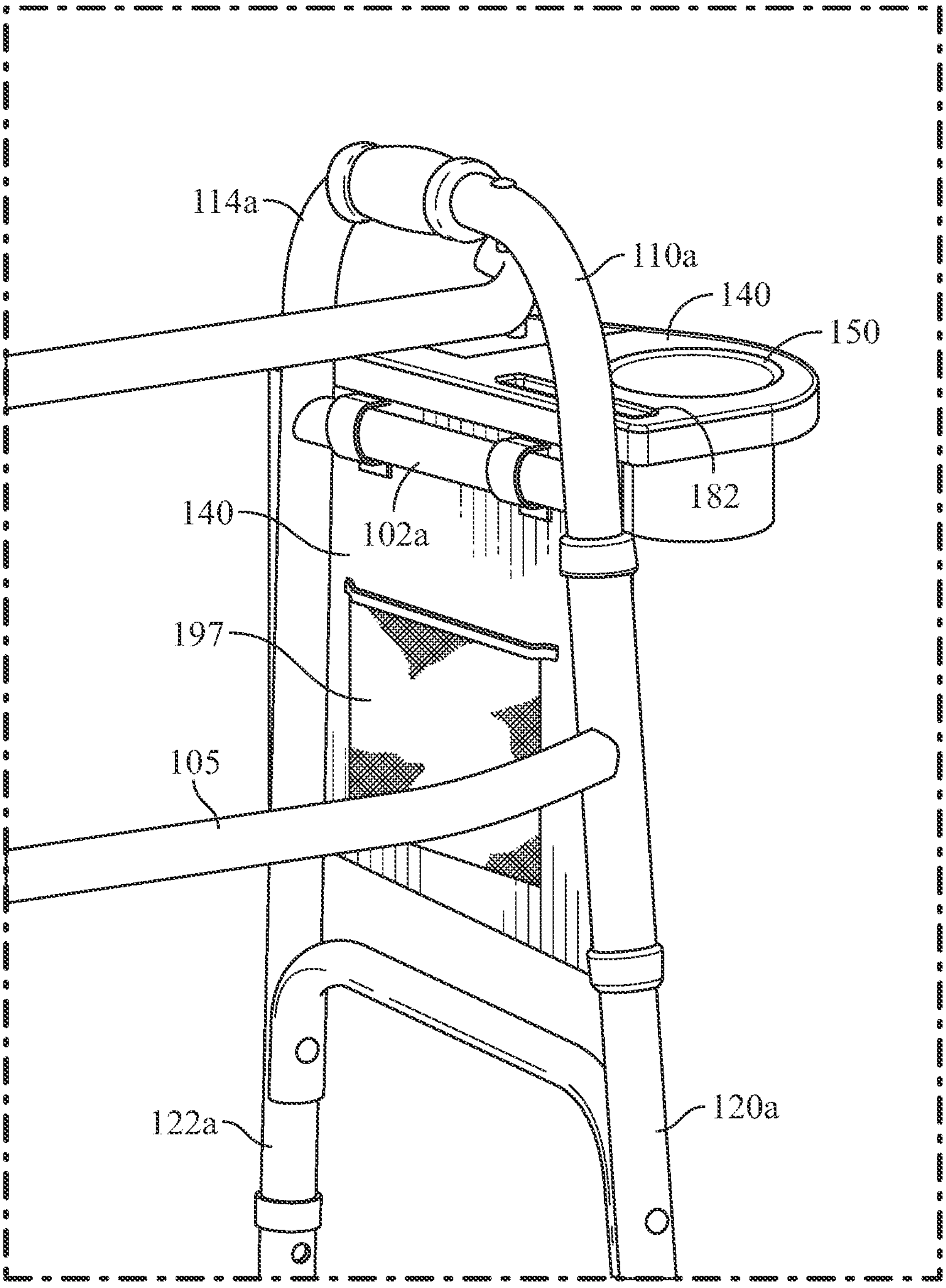
FIG. 4 illustrates an illustrative depiction of a top view of an ergonomic improvement of a platform defining recesses as disclosed herein.

Referring to FIG. 4, in some embodiments, a platform 140 can be further comprised of a spring clip 203 joined substantially anteriorly to the platform 140 appropriate to assist retainment of one or more larger personnel aids such as a walking cane or umbrella. Preferably, said platform 140 also defines a partially penetrating device recess 182 appropriate to assist retainment of an electronic device as well as a wholly penetrating pouch recess 192 appropriate to assist retainment of a sized stiff collar 195 integral with a pouch-like element 197 for holding small personal items and hangable through pouch recess 192 and potentially extending below platform 140. Said pouch-like element 197 need not be a complete pouch but could be some other element and/or material serving a similar function (e.g., netting, a bladder, a rigid item holding cup).

Figure 5:
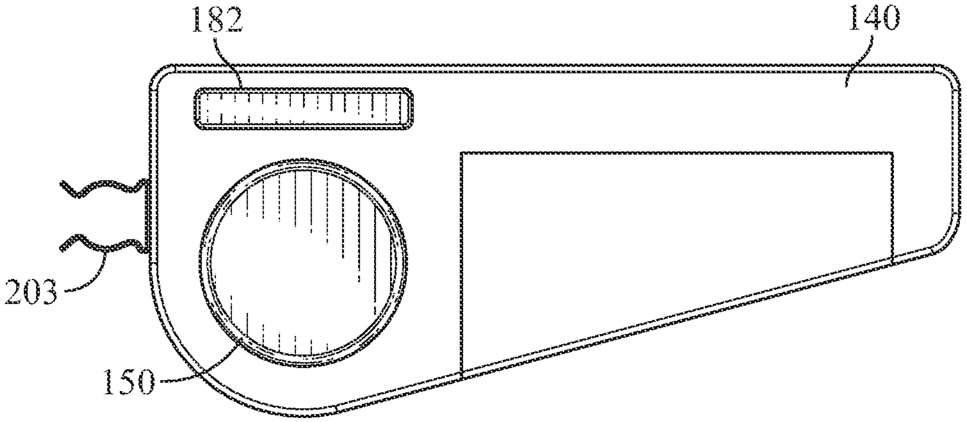
FIG. 5 illustrates an illustrative depiction of a top view of an ergonomic improvement of a tabletop with a dining recess and in a resting position upon a platform defining recesses as disclosed herein.
Figure 6:
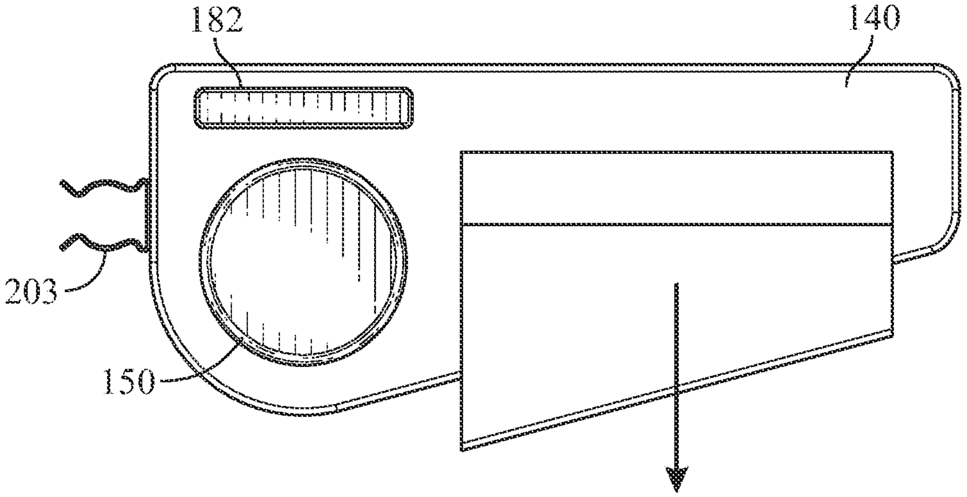
FIG. 6 illustrates an illustrative depiction of a top view of an ergonomic improvement of a tabletop as disclosed herein
Figure 7:
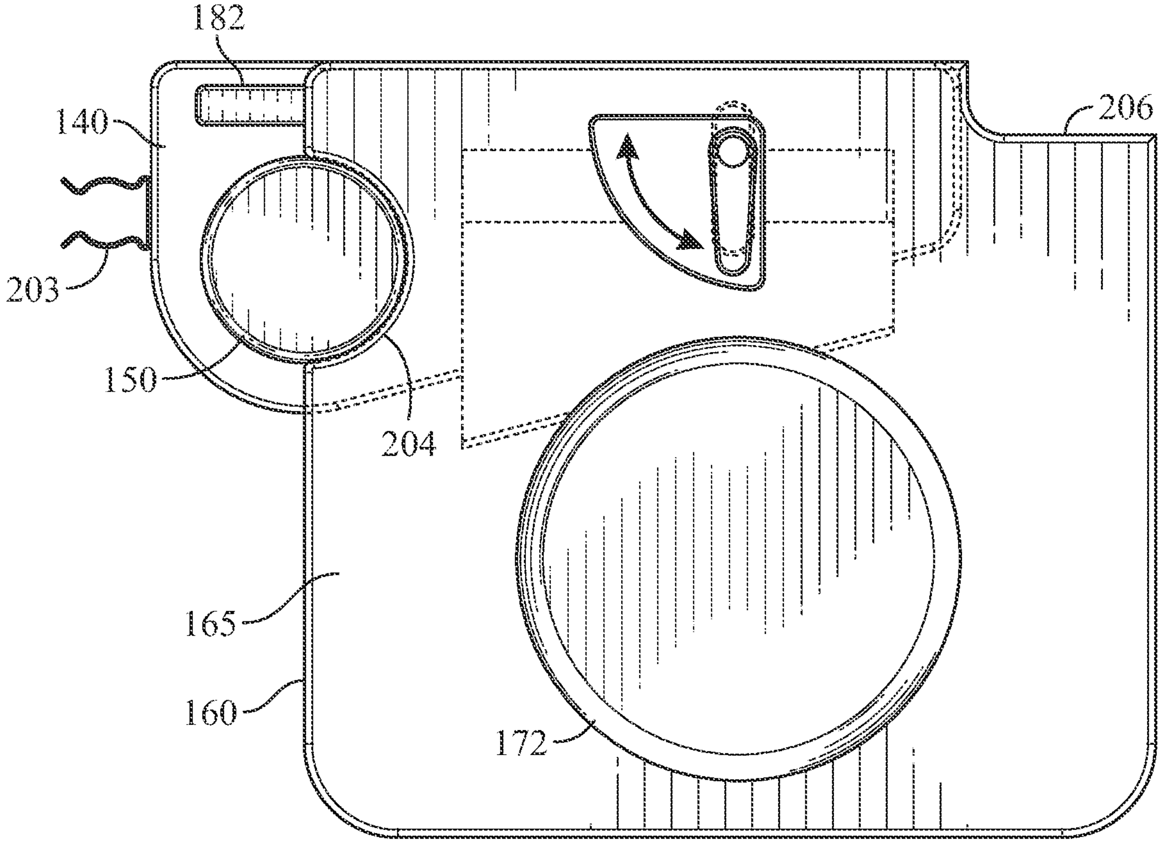
FIG. 7 illustrates an illustrative depiction of a top view of an ergonomic improvement of a tabletop as disclosed herein The drawings are not necessarily to scale, and certain features and certain views of the drawings may be shown exaggerated in scale or in schematic in the interest of clarity and conciseness.

Referring to FIG. 5, in some embodiments a tabletop 160 in working position preferably defines the boundaries of cup cutout 204 sized and shaped to permit the boundaries of the cup cutout 204 to approximate a portion of the boundaries of the cup recess 150 of platform 140. Tabletop 160 may also define the boundaries of a pole cutout 206 to allow less obstructed transitioning of the tabletop 160 from a resting position to a working position—such obstruction possibly arising from the positioning of the front leg section 112*a* of lateral support 102*a* as well as potentially from spring clip 203.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the substance and spirit of the following claims. By way of non-exclusive example, the current description focuses upon the arrangement of a platform 140 and tabletop 160 mostly associated with the left lateral side of walker 100, when the arrangement could likewise be mirrored on the right lateral side of walker 100. Another non-exclusive example would relate to not obfuscating the inventive elements and features with descriptions of elements well known in the mechanical arts (i.e., description of a height retaining pin/element/method for a locking mechanism, rotatable sleeve, etc. description/depiction of an articulable joint partially formed by the tip of an arm extending from a rotatable sleeve, or connecting means between leg termini and wheel assemblies).

What is claimed is:

1. A wheeled mobility walker to assist ambulation, comprising:

a first and second side lateral support element joined to one another by an at least one transversing element in a substantially planarly parallel opposing relation; each lateral support element defining an upper support element connecting a front and back leg; each front leg defining a lower leg terminus section attached by connecting means to a wheel assembly, wherein the improvement comprises;

a platform laterally joined to the first lateral support element wherein the tabletop defines a cup recess appropriate to assist retainment of a drinking cup and further defines a pouch recess appropriate to assist retainment of a sized stiff collar integral with a pouch-like element for holding personal items and further defines a device recess appropriate to assist retainment of electronic devices; and a tabletop defining a recess appropriate to assist retainment of a dining plate and joined to the front leg of the first side frame via a locking mechanism with an arm extending to a tip at least partially defining an articulable joint for adjusting the tabletop orientation and position wherein the tabletop is transitionable from a resting position substantially vertically orientated anterior to the transversing element to a working position substantially horizontally orientated lateral to the first lateral support element wherein the tabletop rests upon the platform while in the working position; and a spring clip joined substantially anteriorly to the platform appropriate to assist retainment of a personal aid.

2. A wheeled mobility walker to assist ambulation, comprising:

a first and a second lateral support element joined to one another by an at least one transversing element in a substantially planarly parallel opposing relation; each lateral support element defining an upper support element connecting a front and back leg; each front leg defining a lower front leg terminus section attached by connecting means to a wheel assembly, wherein the improvement comprises;

a platform laterally joined to the first side frame wherein the platform defines a first set of at least one recess; and a tabletop joined to the front leg of the first side frame by connecting means wherein the tabletop is transitionable from a resting position substantially vertically orientated anterior to the front leg of the first lateral support element to a working position substantially horizontally orientated lateral to the lateral support element; wherein the connecting means for joining the tabletop to the first lateral support element comprises a locking mechanism connected to a portion of the front leg section of the first side frame, and wherein said connecting means also comprises an arm extending from the locking mechanism terminating in a tip at least partially defining an articulable joint for adjusting the tabletop orientation and position.

3. A wheeled mobility walker to assist ambulation, comprising:

a first and a second lateral support element joined to one another by an at least one transversing element in a substantially planarly parallel opposing relation; each lateral support element defining an upper support element connecting a front and back leg; each front leg defining a lower front leg terminus section attached by connecting means to a wheel assembly, wherein the improvement comprises;

a platform laterally joined to the first side frame wherein the platform defines a first set of at least one recess; and a tabletop joined to the front leg of the first side frame by connecting means wherein the tabletop is transitionable from a resting position substantially vertically orientated anterior to the front leg of the first lateral support element to a working position substantially horizontally orientated lateral to the lateral support element; further comprising each back leg defining a lower leg terminus section attached by connecting means to a wheel assembly; and wherein the connecting means for joining the tabletop to the first lateral support element comprises a locking mechanism substantially encircling a portion of the front leg section of the first side frame, and wherein said connecting means also comprises an arm extending from the locking mechanism terminating in a tip at least partially defining an articulable joint for adjusting the tabletop orientation and position.

* * * * *